(12) United States Patent
Winkleman et al.

(10) Patent No.: US 8,733,288 B2
(45) Date of Patent: May 27, 2014

(54) ANIMAL LITTERS

(75) Inventors: Adam Winkleman, Cambridge, MA (US); Igor Sokolik, Cambridge, MA (US); Ying Tang, Cambridge, MA (US); Wendell Ray Guffey, Swansea, IL (US); Yimin Zhang, Ballwin, MO (US); Regina Pratt, St. Louis, MO (US); Seth Johnson, Cambridge, MA (US); Brian Mayers, Cambridge, MA (US); Patrick Reust, Cambridge, MA (US); Eric Keller, Brighton, MA (US)

(73) Assignee: Nestec S.A., Vevey (CH)

( * ) Notice: Subject to any disclaimer, the term of this patent is extended or adjusted under 35 U.S.C. 154(b) by 390 days.

(21) Appl. No.: 12/998,257

(22) PCT Filed: Nov. 10, 2009

(86) PCT No.: PCT/US2009/006072
§ 371 (c)(1),
(2), (4) Date: Jul. 12, 2011

(87) PCT Pub. No.: WO2010/056321
PCT Pub. Date: May 20, 2010

(65) Prior Publication Data
US 2011/0253055 A1    Oct. 20, 2011

Related U.S. Application Data

(60) Provisional application No. 61/115,397, filed on Nov. 17, 2008, provisional application No. 61/277,484, filed on Sep. 25, 2009.

(51) Int. Cl.
*A01K 29/00*     (2006.01)
(52) U.S. Cl.
USPC .......................................................... 119/173

(58) Field of Classification Search
USPC .......................................................... 119/173
See application file for complete search history.

(56) References Cited

U.S. PATENT DOCUMENTS

| | | | |
|---|---|---|---|
| 2,531,427 A | 11/1950 | Hauser |
| 3,586,478 A | 6/1971 | Neumann |
| 3,789,797 A | 2/1974 | Brewer |
| 4,036,928 A | 7/1977 | Valenta |
| 4,085,704 A | 4/1978 | Frazier |
| 4,108,932 A | 8/1978 | Takewell |
| 4,157,696 A | 6/1979 | Carlberg |
| 4,163,674 A | 8/1979 | Been |

(Continued)

FOREIGN PATENT DOCUMENTS

| | | | |
|---|---|---|---|
| EP | 0378421 B1 | 7/1990 |
| JP | 62-239932 A | 10/1987 |
| JP | 614669 B | 1/1994 |
| JP | 10-262482 B | 10/1998 |

*Primary Examiner* — Kristen C Hayes
(74) *Attorney, Agent, or Firm* — Julie M Lappin; Benjamin J. Sodey

(57) ABSTRACT

Animal litters and methods of making and using such litters are disclosed herein. The animal litters comprise (a) a plurality of absorbent particles comprising (i) a non-swelling particle and (ii) a clumping material coated on the non-swelling particle and (b) a plurality of one or more filler particles that are not associated with the absorbent particles. The filler particles provide additional functionality to the litters, e.g., controlling odor, absorbing moisture, releasing fragrance, controlling microorganisms, controlling dust, reducing density, reducing weight, and combinations thereof. The litters are made by producing the absorbent particles using conventional means and combining the absorbent particles with one or more filler particles that impart the desired characteristic to the litters.

20 Claims, 2 Drawing Sheets

(56) References Cited

U.S. PATENT DOCUMENTS

| | | |
|---|---|---|
| 4,187,803 A | 2/1980 | Valenta |
| 4,278,047 A | 7/1981 | Luca |
| 4,407,231 A | 10/1983 | Colborn et al. |
| 4,459,368 A | 7/1984 | Jaffee et al. |
| 4,622,920 A | 11/1986 | Goss |
| 4,641,605 A | 2/1987 | Gordon |
| 4,657,881 A | 4/1987 | Crampton et al. |
| 4,689,297 A | 8/1987 | Good et al. |
| 4,704,989 A | 11/1987 | Rosenfeld |
| 4,976,977 A | 12/1990 | Johnson et al. |
| 5,062,383 A | 11/1991 | Nelson |
| 5,094,189 A | 3/1992 | Aylen et al. |
| 5,101,771 A | 4/1992 | Goss |
| RE33,983 E | 7/1992 | Hughes |
| 5,129,365 A | 7/1992 | Hughes |
| 5,146,877 A | 9/1992 | Jaffee et al. |
| 5,169,307 A | 12/1992 | Frey |
| 5,176,107 A | 1/1993 | Buschur |
| 5,183,010 A | 2/1993 | Raymond |
| 5,188,064 A | 2/1993 | House |
| 5,193,489 A | 3/1993 | Hardin |
| 5,196,473 A | 3/1993 | Valenta et al. |
| 5,267,531 A | 12/1993 | Appel et al. |
| 5,303,676 A | 4/1994 | Lawson |
| 5,317,990 A | 6/1994 | Hughes |
| 5,339,769 A | 8/1994 | Toth et al. |
| 5,359,961 A | 11/1994 | Goss et al. |
| 5,386,803 A | 2/1995 | Hughes |
| 5,421,291 A | 6/1995 | Lawson et al. |
| 5,452,684 A | 9/1995 | Elazier-Davis et al. |
| 5,469,809 A | 11/1995 | Coleman |
| 5,503,111 A | 4/1996 | Hughes |
| 5,529,022 A | 6/1996 | Nelson |
| 5,542,374 A | 8/1996 | Palmer, Jr. |
| 5,577,463 A | 11/1996 | Elazier-Davis et al. |
| 5,609,123 A | 3/1997 | Luke |
| 5,647,300 A | 7/1997 | Tucker |
| 5,664,523 A | 9/1997 | Ochi et al. |
| 5,735,232 A | 4/1998 | Lang et al. |
| 5,743,213 A | 4/1998 | Fujiura |
| 5,762,023 A | 6/1998 | Carter |
| 5,775,259 A | 7/1998 | Tucker |
| 5,806,462 A | 9/1998 | Parr |
| 5,824,226 A | 10/1998 | Boyd et al. |
| 5,826,543 A | 10/1998 | Raymond et al. |
| 5,836,263 A | 11/1998 | Goss et al. |
| 5,840,113 A | 11/1998 | Freeman et al. |
| 5,882,480 A | 3/1999 | Knapick et al. |
| 5,901,661 A | 5/1999 | Pattengill et al. |
| 5,960,743 A | 10/1999 | Taylor |
| 5,964,186 A | 10/1999 | Koneke |
| 5,975,019 A | 11/1999 | Goss et al. |
| 5,992,351 A | 11/1999 | Jenkins |
| 6,019,063 A | 2/2000 | Haubensak et al. |
| 6,020,282 A | 2/2000 | Taylor et al. |
| 6,039,004 A | 3/2000 | Goss et al. |
| 6,089,189 A | 7/2000 | Goss et al. |
| 6,089,190 A | 7/2000 | Jaffee et al. |
| 6,210,625 B1 | 4/2001 | Matsushita et al. |
| 6,371,050 B1 | 4/2002 | Mochizuki |
| 6,767,507 B1 | 7/2004 | Woo et al. |
| 6,887,570 B2 | 5/2005 | Greene et al. |
| 6,939,387 B2 | 9/2005 | Elizer |
| 7,337,747 B2 | 3/2008 | Wang et al. |
| 2003/0144379 A1 | 7/2003 | Mitchell et al. |
| 2003/0148100 A1 | 8/2003 | Greene et al. |
| 2005/0005870 A1 | 1/2005 | Fritter |
| 2005/0224008 A1 | 10/2005 | Greene et al. |
| 2006/0201438 A1 | 9/2006 | Antilla |
| 2007/0289543 A1 | 12/2007 | Petska et al. |

ANIMAL LITTERS

CROSS REFERENCE TO RELATED APPLICATIONS

This application is a national stage application under 35 U.S.C. §371 of PCT/US2009/006072 filed Nov. 10, 2009, which claims priority to U.S. Provisional Application Ser. No. 61/115,397 filed Nov. 17, 2008 and U.S. Provisional Application Ser. No. 61/277,484 filed Sep. 25, 2009, the disclosures of which are incorporated herein by this reference.

BACKGROUND OF THE INVENTION

1. Field of the Invention

The invention relates generally to animal lifters and particularly to animal litters having improved functional and other properties.

2. Description of Related Art

Clay-based animal litters represent a significant portion of the animal litter market, e.g., litter for cats, dogs, rabbits, and other small animals. In one form, the litters are clumping litters. Clumping litters generally comprise non-swelling particles coated with swelling particles, e.g., clay or agglomerated clay particles (clay fines) coated with bentonite. U.S. Pat. No. 688,750 discloses such litters. Several such engineered litters are known in the art. U.S. Pat. No. 7,527,019 discloses methods for producing clumping animal litter compositions and the compositions. U.S. Pat. No. 7,331,309 discloses clumping animal litter compositions and methods of producing the compositions. U.S. Pat. No. 7,124,710 discloses clumping animal lifters and methods for making the litters. U.S. Pat. No. 6,962,129 discloses clumping compacted bicarb litters. U.S. Pat. No. 6,887,570 discloses coated clumping litters. U.S. Pat. No. 5,826,543 discloses clumpable animal litters containing a dust reducing agent. U.S. Pat. No. 7,478,610 discloses a clumping cat litter containing polysaccharide, zeolite, Yucca schidegira, distillers dried grains, salt compounds, and antimicrobial agents. US20090007852A1 discloses composite absorbent particles useful for litters. U.S. Pat. No. 7,429,421 discloses coated clumping litter comprising non-swelling particles. Generally, these litters function well for their intended purpose, e.g., managing animal urine and feces through liquid absorption and clumping with feces. However, these lifters are made from dense clays; the handling and shipping costs are relatively high. Additionally, these lifters are often inadequate for some functions, e.g., effectively controlling odors and microbial growth. Therefore, there is a need for litters that have improved functional and related properties.

SUMMARY OF THE INVENTION

It is, therefore, an object of the invention to provide animal litters having improved functional and other properties.

It is another object of the invention to provide animal litters having effective odor control properties.

It is another object of the invention to provide animal litters having enhanced moisture absorbance properties.

It is another object of the invention to provide animal litters having antimicrobial properties.

It is another object of the invention to provide animal litters having enhanced dust control properties.

It is another object of the invention to provide animal litters that are less dense and/or weigh less than comparable animal litters.

It is another object of the invention to provide methods for making animal litters having improved functional and other properties.

These and other objects are achieved using animal litters comprising (a) a plurality of absorbent particles comprising (i) a non-swelling particle and (ii) a clumping material coated on the non-swelling particle and (b) a plurality of one or more filler particles that are not associated with the absorbent particles. The filler particles provide additional functionality to the litters, e.g., controlling odor, absorbing moisture, releasing fragrance, controlling microorganisms, controlling dust, reducing density, reducing weight, and combinations thereof. The litters are made by producing the absorbent particles using conventional means and combining the absorbent particles with one or more filler particles that impart the desired characteristic to the litters.

Additional and further objects, features, and advantages of the invention will be readily apparent to those skilled in the art.

DETAILED DESCRIPTION OF THE INVENTION

Definitions

Figure 1:
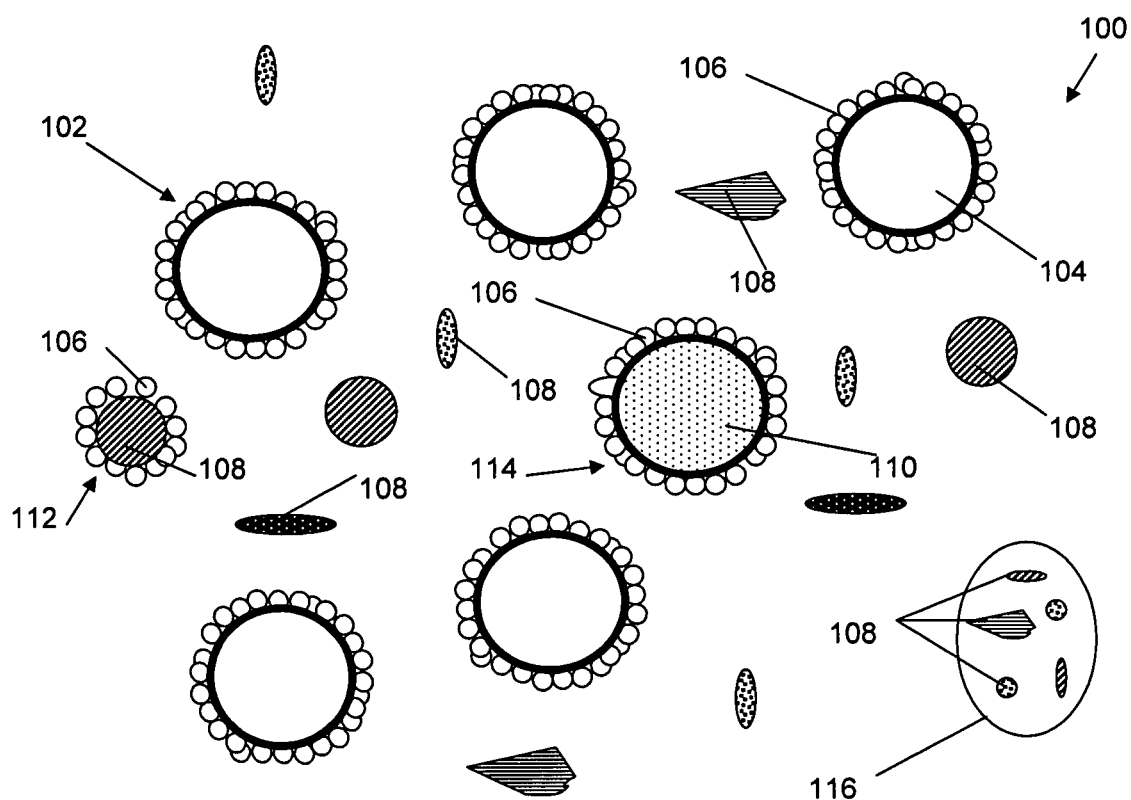
FIG. 1 shows an exemplary animal litter in accordance with one embodiment of the invention.

The term "odor control" means the ability of a filler particle to interact with an odor causing substance or material so as to absorb, adsorb, reduce, eliminate, or mask the odor of the substance or material.

The term "plurality" means to two or more of an item. For example, two or more, three or more, four or more, five or more, six or more, seven or more, eight or more, nine or more, ten or more, twenty or more, fifty or more, 100 or more, 500 or more, 1000 or more, 10,000 or more, etc., of an item.

The term "not associated" means that filler particles are not attached, either directly or indirectly, including not being attached covalently, or non-covalently (e.g., via a charge-charge or other mechanism), not being linked, bound, complexed, or otherwise adhered to absorbent particles.

The term "biological material" means a material derived from a once-living natural source such as a plant or animal.

The term "biodegradable polymer" means a polymer that degrades into individual monomers, or further into sub-monomer, under ambient environmental conditions. Suitably environmental conditions include temperature ranges of about 0° C. to about 80° C., sunlight, moisture (e.g., humidity and/or snow, rain, etc) and/or normal bacterial consumption.

THE INVENTION

In one aspect, the invention provides animal litters. The litters comprise:
(a) a plurality of absorbent particles comprising:
  (i) a non-swelling particle; and
  (ii) a clumping material coated on the non-swelling particle; and
(b) a plurality of one or more filler particles that are not associated with the absorbent particles.

The absorbent particles comprise non-swelling particles coated with a clumping material. The non-swelling particles can be made of any material that can be coated with a clumping material and function as a litter, e.g., organic and inorganic materials such as clay, wood, sawdust, and the like. In preferred embodiments, the non-swelling particle comprises a clay particle or an agglomeration of clay particles. Non-swelling particles useful in the invention are known to skilled artisans, e.g., U.S. Pat. No. 5,887,570. The clumping material can be any material that form clumps when exposed to animal waste or a combination of such materials. In one embodiment, the "clumping material" is a mixture of two or more clumping materials. Materials that form clumping litters are known to skilled artisans, e.g., U.S. Pat. No. 7,527,019, U.S. Pat. No. 7,331,309, US20070289543, U.S. Pat. No. 7,124,710, U.S. Pat. No. 5,836,263, U.S. Pat. No. 6,745,720, and the like. In preferred embodiments, the clumping material is bentonite.

In various embodiments, the filler particles are any particles that are compatible with the absorbent particles and add desirable functions or other properties to the litter. For example, the filler particles may reduce the density and/or weight of the litter when compared to a litter with the same absorbent particles but with no filler particles. Such litters will be easier to handle and cheaper to ship. Similarly, the filler particles may alter the appearance of the litter when compared to a litter the same absorbent particles but with no filler particles. Such litter can be more pleasing to the consumer and can be altered to accommodate the wants or needs of a consumer. Manipulating the appearance, density, weight, odor, and other desirable properties of the litters using filler particles improves the litters compared to litters without the filler particles.

In one embodiment, filler particles are one or more biodegradable polymers, such as, but not limited to, a caprolactone, a hydroxyburic acid, a lactide, a glycolide, a polyanhydride, a polyester, chitosan, poly(vinylpyridine) and its copolymers, poly(vinylpyrrolidone) and its copolymers, and combinations thereof. The biodegradable polymers can also comprise various termination groups (e.g., carboxylic acid groups, ester groups, amine groups, sulfonic acid groups, etc.), can be cross-linked, or can be prepared as copolymers. In suitable embodiments, the filler particles comprise one type of biodegradable polymer, though in other embodiments, multiple different biodegradable polymers can be utilized together as filler particles. The biodegradable polymers are useful for altering the appearance and density of the litters. Similarly, biodegradable polymers may permit the litter to be disposed of in a more environmental friendly manner.

Molecular weights of the biodegradable polymers can be selected by those of ordinary skill in the art, and suitably will be in the range of about 1000 MW to about 2,000,000 MW, more suitably about 1,000 MW to about 1,000,000 MW, about 1,000 MW to about 500,000 MW, about 1,000 MW to about 200,000 MW, about 1,000 MW to about 100,000 MW, about 1,000 MW to about 50,000 MW, about 1,000 MW to about 20,000 MW, about 1,000 MW to about 10,000 MW, etc., and values within these ranges.

In selecting a biodegradable polymer for use as a filler particle in the animal litters, care must be taken to select a polymer that degrades to non-toxic products and does not release toxic byproducts during degradation. In addition, the biodegradable polymer must also be non-toxic to both humans and the animal that is using the litter (e.g., cats, rabbits, and other small mammals). Suitably, the biodegradable polymer is hypo-allergenic so as to reduce the possibility of an allergic reaction in both human and animal. In addition, the polymer should not produce excess dust or debris, and therefore, suitably should be non-fragmenting and non-crumbling. In additional embodiments, a material can be added to the litter and/or removed clumps that aid in the degradation of the polymers. Additional degradable materials beyond biodegradable polymers can also be used as filler particles in the invention. In a preferred embodiment, filler particles (FIG. 1, 108) comprise one or more biodegradable polymers.

In further embodiments, the filler particles are one or more biological materials. Exemplary biological materials for use in the invention include, but are not limited to, wood pellets or shavings (including cedar, pine and other aromatic woods), oat hulls, peanut hulls, corn products (including corn husks and/or cobs), alfalfa, dried citrus peel, cellulose, byproducts of wheat (e.g., wheat hulls), byproducts of barley (e.g., barley hulls), byproducts of soy, paper, etc. The addition of a biological material as a filler particle in the litters provides additional functionality to the litter, including odor absorption, fragrance release, moisture absorption, and density reduction. As with biodegradable polymers, the biological materials are useful for altering the appearance, density, and odor of the litters and permit may permit the litter to be disposed of in a more environmental friendly manner.

In other embodiments, the filler particles are one or more zeolites. Zeolites are naturally occurring, microporous hydrated aluminosilicates. Zeolites occur in about 48 different natural forms, and about 150 synthetic forms. Zeolites are able to capture up to about 55% of their weight in water, and also absorb nitrogen. Suitable zeolites for use in the practice of the invention include, but are not limited to, chabazite, heulandite, natrolite, phillipsite, stilbite, clinoptilolite ((Na, K,Ca)$_2$-3Al$_3$(Al,Si)$_2$Si1$_3$O$_{36}$.12(H$_2$O)), analcime (NaAlSi$_2$O$_6$.H$_2$O), zeolite A (synthetic (Na$_{12}$(Al$_{12}$Si$_{12}$O$_{48}$) .27H$_2$O)), and combinations thereof.

In additional embodiments, filler particles are one or more charged polymers such as polymers having a carboxylic acid functionality, a sulfonate functionality, an ammonium functionality, a phosphate functionality, or an ester functionality. Dust generated in the use and manufacture of animal litters can be irritating and harmful when inhaled by the animal and/or human, e.g., long term exposure can cause silicosis. The addition of one or more charged polymers as filler particles in the clumping litter reduces or even eliminates airborn dust particles, as electrostatic interactions between the polymers and the dust particles trap the dust, thus reducing the amount of free dust in the air when the litter is dispensed from the bag or used by an animal. Molecular weights of the charged polymers can be selected by those of ordinary skill in the art, and suitably will be in the range of about 1000 MW to about 2,000,000 MW, more suitably about 1,000 MW to about 1,000,000 MW, about 1,000 MW to about 500,000 MW, about 1,000 MW to about 200,000 MW, about 1,000 MW to about 100,000 MW, about 1,000 MW to about 50,000 MW, about 1,000 MW to about 20,000 MW, about 1,000 MW to about 10,000 MW, etc., and values within these ranges.

Polymers that display bactericidal properties (including bacteria- and microbe-killing properties) are well known in the art, and include, for example, chitosan, polycaprolactone-chitosan copolymers and poly(vinylpyridine) copolymers.

Additional polymers that can be used as the filler particles include super-absorbent polymers. These polymers suitably absorb more water by volume and weight when compared to clay materials. Exemplary super-absorbent polymers include various hydrogels, cross-linked sodium polyacrylate, polyacrylamide copolymer, ethylene maleic anhydride copolymer, cross-linked carboxy-methyl-cellulose, polyvinyl alcohol copolymers, cross-linked polyethylene oxide, and starch grafted copolymer of polyacrylonitrile, etc. The use of super-absorbent polymers allows for absorption of liquid waste, but can reduce the weight and/or density of the litters, thereby reducing shipping costs.

In other embodiments, the filler particles are organic salts, inorganic salts, metallic particles, or combinations therefor, e.g., Ag, Cu, or Zn particles and $NaHCO_3$. Such organic and inorganic salts, and methods of producing such salts are well known to skilled artisans. Organic and/or inorganic salts can aid in the coordination of ionic polymers when such polymers are used as filler particles. The metallic particles provide antimicrobial properties (including antibacterial properties) and reduce the density of the litter. Suitably, the metallic particles are metallic nanoparticles are contained, e.g., embedded, enclosed, encased or encapsulated, in a matrix or particle, for example a polymeric carrier particle (FIG. 1, 116). Exemplary polymeric materials that can be used to prepare the carrier particles 116 are described herein and otherwise known in the art. Suitably, the metallic nanoparticles have a size of about 1 nm to about 1000 nm. In exemplary embodiments, the polymeric filler particles comprise different metallic nanoparticles. Use of a plurality of metallic nanoparticles increases the overall available surface area of the metals.

In additional embodiments, the filler particles are one or more magnetic particles, e.g., magnetite. Use of magnetic filler particles aids in the removal of clumped animal litter, e.g., using a magnetic scoop. The amount of magnetic particles are generally high enough that the particles aid in litter clumping, especially when utilizing a magnetic scoop, but not too high such that single particles adhere to each other without aiding in clumping. Further, as described herein, the magnetic particles can be contained within a carrier particle such as a polymeric carrier. The magnetic particles can be discrete, individual particles, or can be prepared as a particle solution.

In one embodiment, the filler particles comprise activated carbon if amounts sufficient to control odors from animal waste. The use of activated carbon for litter applications is known in the art for some applications, e.g., U.S. Pat. No. 5,860,391, U.S. Pat. No. 7,059,273, and US2007017453. The activated carbon can be dispersed within all or part of the filler particles, coated onto all or a part of the surface of the filler particles, or a combination thereof.

The amount of filler particles for use in the litters depend upon several factors, including the type of filler particles, the final desired properties of the litter, the application of the litter (e.g., type of animal and/or setting), cost, weight, and the like. Generally, the filler particles comprise about 0.1% to about 50% by weight of the animal litter. Measurement of the weight percent of the filler particles is conducted by comparing the total weight of the filler particles to the total weight of the filler particles and the other components of the litter, e.g., clay and bentonite. In various embodiments, the filler particles comprise about 0.5 to about 40% by weight of the animal litter, preferably about 1 to about 40%, about 5 to about 40%, about 10 to about 40%, about 20 to about 40%, about 30 to about 40, or about 30 to about 35%, and any percentage within these ranges.

As shown in FIG. 1 (not to scale), the filler particles 108 can have various diverse sizes and shapes. Suitably, the filler particles have a size range of about 1 to about 300 mesh, more suitably about 3 to about 200 mesh, about 3 to about 150 mesh, about 5 to about 150 mesh, about 10 to about 150 mesh, about 20 to about 150 mesh, about 50 to about 150 mesh, or about 100 to about 150 mesh, and any value within these ranges. Preferably the filler particles have a size range of about 3 to about 150 mesh, the clumping material particles have a size range of about 100 to about 300 mesh, and the non-swelling particles have a size range of about −10 to about +50 mesh. In embodiments, the clumping material particles are about 20% to about 40% by weight of the absorbent particles.

In one embodiment, the filler particles are contained in one or more carrier particles suitable for use in an animal litter. Such carrier particles are known to skilled artisans.

In a preferred embodiment, the animal litters comprise two or more filler particles. In another preferred embodiments, the animal litters comprise three, four, five, six, or more filler particles.

In one embodiment, the invention provides an animal litter 100, as shown in FIG. 1. The litter comprises a plurality of absorbent particles 102 comprising non-swelling clay particles 104, with clumping material particles 106 coated on the non-swelling particles 104. The litter 100 also comprises one or more filler particles (e.g., 108, 112, 114, 108/116) that are not associated with the non-swelling particles. The non-swelling clay particles that are coated with a clumping material are disclosed in U.S. Pat. No. 6,887,570. Referring to FIG. 1, absorbent particles 102 include clay fines agglomerated into non-swelling clay particles 104, which are coated with clumping material particles 106. The clay fines used in the agglomeration process are suitably about −50 mesh in size and are sometimes referred to as a clay seed base or a seed material. In an exemplary embodiment, non-swelling clay particles 104 range in size from about −10 mesh to about +50 mesh, based on U.S. standard mesh.

In an exemplary embodiment, the clay fines are agglomerated using a pin mixer. Clumping material particles 106 are applied to particles 104 to form a coating. Exemplary clumping material particles include sodium bentonite powder and a bentonite/guar gum blended powder. In exemplary embodiments, the coatings may be augmented with either or both of an odor control agent and an anti-microbial agent. Generally, particles 102 are spherical in shape, though any suitable shape and size can be produced and used for the invention.

Exemplary methods for producing the absorbent particles 102 utilizing clay fines are disclosed in U.S. Pat. No. 6,887,570. Methods for coating the non-swelling clay particles 104 with bentonite are also disclosed in U.S. Pat. No. 6,887,570. As described in U.S. Pat. No. 6,887,570, bentonite having a particle size of about 100 mesh to about 300 mesh, more suitably about 200 mesh, is coated on the clay particles using a centrifugal coater or a rotary coater/dryer system for improved clumping capability. In additional embodiments, the bentonite can be coated on the clay particles using a fluidized bed dryer, a semi-continuous centrifugal coater, or a rotary coating and drying system.

The resulting absorbent particles 102 are typically in the −10 to +50 mesh size range, with a moisture content from about 15% to about 5%, suitably with a moisture content of about 8%. In one embodiment, the clumping material coating is about 20% to about 40% by weight of the absorbent particle (and therefore, of the litter). In an alternative embodiment, the clumping material coating is about 25% to about 35% by weight of the absorbent particle. In a further alternative embodiment, the clumping material coating is about 30% by weight of the absorbent particle.

The clumping litter has superior clumping properties as the active clumping material (e.g., bentonite) is kept on the surface of the particles, where the clumping bonds are formed. Coating with bentonite provides a litter that includes the clumping and absorption qualities of a litter that is composed solely of sodium bentonite. However, due to the coating process, the amount by weight of sodium bentonite is reduced over known clumping litters. This yields a more efficient use of the sodium bentonite, while providing a production cost savings over those litters with higher percentage amounts of sodium bentonite. In addition, the coated litter produced provides a lighter weight product and has a unique, homogeneous appearance that appeals to consumers. Further, the agglomeration process results in a utilization of clay product fines, which heretofore have been considered waste products, and since clay is not biodegradable, clay fines have traditionally required space for disposal.

As described throughout, the clumping litters of the present also further comprise one or more filler particles (e.g., 108, 110, 112 and/or 108/116) that are not associated with the absorbent particles.

As described throughout, the filler particles are not associated with the absorbent particles. Not associated is used to indicate that the filler particles are not associated with either the non-swelling particles 104, and/or the clumping material particles 106 of the absorbent particles 102. Thus, as shown in FIG. 1, the filler particles 108 are free from association with the absorbent particles 102. While in exemplary embodiments the filler particles will also be separate from each other, in other embodiments, they can be attached, associated, or otherwise complexed with each other (either of the same or a different composition) to form aggregates or the like.

As shown in FIG. 1, the animal litters comprise one or more, e.g., two or more, three or more, four or more, five or more, six or more, seven or more, eight or more, nine or more, ten or more, etc., filler particles. FIG. 1 shows that the filler particles 108 can be various types, shapes, sizes, colors, etc. In further embodiments, filler particles 108 can be contained within a carrier particle 116, as shown in FIG. 1. As described herein, suitably carrier particle 116 comprises a polymer in which filler particles 108 are contained. As used herein, "contained" means that the filler particles 108 are embedded, dispersed, encapsulated, enclosed, or otherwise associated with carrier particle 116. Suitably, the filler particles 108 are accessible to external waste, gases, etc., and thus, are suitably on the outside surface of carrier particle 116, or carrier particle is porous so that it allows access to the filler particles contained within it.

The filler particles suitably impart a characteristic and/or functionality to the animal litter that otherwise would not otherwise be present in the litter. The filler particles are suitably selected for one or more of their characteristics and/or functionality. This selection can include the amount, composition, weight, number (including total number and number of different types of particles) and characteristics of the filler particles. Exemplary desirable properties and functionalities include, but are not limited to, controlling odor, absorbing moisture, releasing fragrance (including time-release fragrance), controlling microorganisms (e.g., antimicrobial, antibacterial, and antiviral properties), controlling dust, (e.g., dust reduction or elimination), reducing density, reducing weight, and combinations thereof.

The filler particles can have one or more of these characteristics/functionalities either in the same particle, or multiple different particles with different characteristics/functionalities can be used, as described herein.

When the filler particles are used for odor control, the odor-causing material may be a fatty acid in animal waste. Additional odor-causing materials include sulfur-containing compounds such as, but not limited to: thiols, sulfides, sulfones, sulfoxides or sulfur-containing heterocyclic compounds or combinations thereof. Specific examples include hydrogen sulfide, dimethyl trisulfide, 3-methyl-3-mercaptobutylformate, or 3-methylbutenethiol or combinations thereof. Additional odor-causing materials include nitrogen-containing compounds such as, but not limited to: amines, ammonia, amides, nitro and nitrogen-containing heterocyclic compounds. Specific examples include 2-Acetypyrazine, 2methoxypyrazine, spermine, spermidine or putrescine or combinations thereof.

As described herein, in exemplary embodiments, the animal litters comprise two or more, three or more, four or more, five or more, six or more, seven or more, eight or more, nine or more, ten or more, and the like different types of filler particles. Thus, the animal litters can comprise two or more different filler particles, where the filler particles are different classes of filler particles (e.g., can comprise combinations of biodegradable polymers, biological materials, and/or zeolites, etc.), or can comprise one general type of material, but different species of this type, for example, two or more different types/compositions of biological materials. As shown in FIG. 1, suitable filler particles 108 are discrete, independent particles, though in other embodiments then can be complexed together (e.g., joined together) or can be contained in carrier particle 116. However, as noted herein, the filler particles are not associated with the absorbent particles.

In further embodiments, as shown 112 in FIG. 1, the filler particles 108 are coated with clumping material particles 106. This allows for use of a reduced amount of non-swelling clay particles, thereby reducing the weight, and potentially the cost of production and/or shipping, of the litter. In still further embodiments, as in 114 of FIG. 1, some of the non-swelling particles coated with a clumping material can be replaced with other core particles 110, and coated with a clumping material 106, thereby reducing the amount of non-swelling particles required to make the animal litter. The filler particles can also be coated with other materials, such as, starches (e.g., potato, rice or corn starch), metal oxides such as $TiO_2$ or $SiO_2$, or mineral powders, such as talc.

As described throughout, the invention also allows for the control and tailoring of the shape, size, color and characteristics (e.g., charge, composition, pH, etc.) of the filler particles. Controlling the shape of the filler particles allows the density of the filler to be modulated. By preparing filling particles with desired color characteristics (e.g., whites, grays, or other colors), the color of the litter can be adjusted to a desired specification, even if the total amount of litter component is reduced.

In exemplary embodiments, the invention provides a clumping animal litter, comprising a plurality of absorbent particles comprising non-swelling clay particles with a size in the range of −10 to +50 mesh, bentonite particles, with a size of about 100 mesh to about 300 mesh, coated on the non-swelling clay particles, and one or more filler particles as described herein. Exemplary filler particles, as well as percentages of the filler particles and the bentonite particles, as well as suitable sizes for the various components are described throughout.

In another aspect, the invention provides methods for making an animal litter. The methods comprise preparing a plurality of absorbent particles by obtaining or manufacturing non-swelling particles and coating the non-swelling particles with a clumping material; combining a plurality of one or more filler particles with the absorbent particles, wherein the filler particles are not associated with the absorbent particles. Useful filler particles as well as amounts and sizes of the filler particles, a clumping material, and non-swelling particles are described herein. In preferred embodiments, the non-swelling particles are clay particles or agglomerated clay particles.

Figure 2:
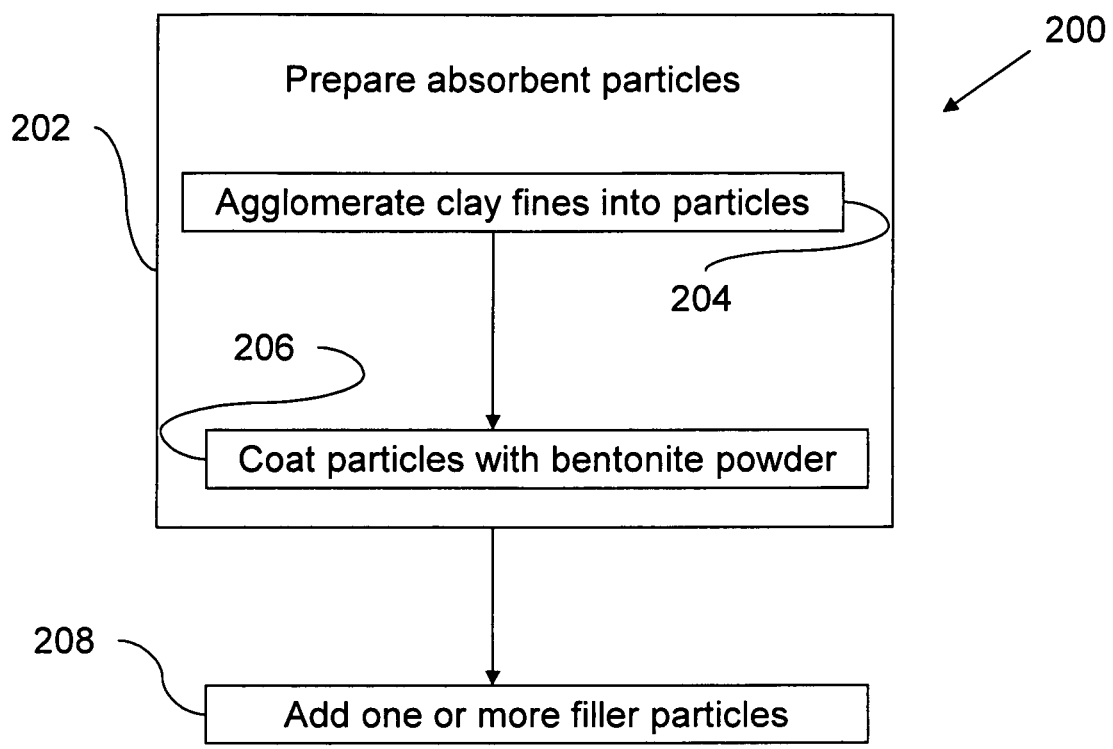
FIG. 2 shows an exemplary method of preparing an animal litter in accordance with one embodiment of the invention.

As shown in flowchart 200 of FIG. 2, in exemplary embodiments, the methods comprise preparing a plurality of absorbent particles in step 202 by agglomerating clay fines into particles in step 204. In step 206, the particles are then coated with a clumping material. In step 208, one or more filler particles are then added. As described throughout, the filler particles are not associated with the absorbent particles.

Exemplary filler particles, amounts (i.e., weight percentages) of filler particles, and sizes of filler particles are described herein. Suitably, the filler particles comprise one or more biodegradable polymers, including, but not limited to, a caprolactone, a hydroxyburic acid, a lactide, a glycolide, a chitosan, a poly(vinylpyridine) copolymer, a polyanhydride and a polyester. In further embodiments, the filler particles comprise biological material, for example, wood pellets, wood shavings, oat hulls, peanut hulls, corn, alfalfa, dried citrus peel or paper. In further embodiments, the filler particles comprise a zeolite, for example, a clinoptilolite, an analcime or a zeolite A. The filler particles can also comprise charged polymers, such as those having a carboxylic acid functionality, a sulfonate functionality, an ammonium functionality, a phosphate functionality, or an ester functionality. Additional filler particles are disclosed herein, and include organic and inorganic oxides, metallic particles, and the like.

Methods of agglomerating clay the fines into particles and coating the particles with a clumping material are described in detail in U.S. Pat. No. 6,887,570. Methods for adding and/or dispersing the various filler particles, including biodegradable polymers, biomaterials, etc., in the litters, include spraying, sieving, mechanical mixing, ultrasonication, vibrational dispersion, etc., and are well known in the art.

In another aspect, the invention provides a means for communicating information about or instructions for one or more of (1) using an animal litter of the invention to manage animal waste; (2) a functional or other property of an animal litter of the invention; (3) methods for controlling odor using an animal litter of the invention; (4) methods for controlling absorbing moisture using an animal litter of the invention; (5) methods for controlling releasing fragrance using an animal litter of the invention; (6) methods for controlling microorganisms using an animal litter of the invention; (7) methods for controlling dust using an animal litter of the invention; (8) methods for controlling reducing density using an animal litter of the invention; (9) methods for controlling reducing weight using an animal litter of the invention; and (10) methods for training an animal to use a litter of the invention. The means comprises a document, digital storage media, optical storage media, audio presentation, or visual display containing the information or instructions. In certain embodiments, the communication means is a displayed website, a visual display kiosk, a brochure, a product label, a package insert, an advertisement, a handout, a public announcement, an audiotape, a videotape, a DVD, a CD-ROM, a computer readable chip, a computer readable card, a computer readable disk, a USB device, a FireWire device, a computer memory, and any combination thereof. Useful information includes one or more of (1) methods and techniques for adapting an animal to the litter and (2) contact information for to use if there is a question about the litter and its use. Useful instructions include methods for cleaning and disposing of the litter. The communication means is useful for instructing on the benefits of using the present invention and communicating the approved methods for using the invention for an animal.

In the specification, there have been disclosed typical preferred embodiments of the invention and, although specific terms are employed, they are used in a generic and descriptive sense only and not for purposes of limitation. Obviously many modifications and variations of the invention are possible in light of the above teachings. It is therefore to be understood that the invention may be practiced otherwise than as specifically described.

As used herein and in the appended claims, the singular forms "a", "an", and "the" include plural reference unless the context clearly indicates otherwise. The terms "comprise", "comprises", and "comprising" are to be interpreted inclusively rather than exclusively.

Unless defined otherwise, all technical and scientific terms and any acronyms used herein have the same meanings as commonly understood by one of ordinary skill in the art in the field of this invention. Although any compositions, methods, and means for communicating information similar or equivalent to those described herein can be used to practice this invention, the preferred compositions, methods, and means for communicating information are described herein.

All references cited above are incorporated herein by reference to the extent allowed by law. The discussion of those references is intended merely to summarize the assertions made by their authors. No admission is made that any reference (or a portion of any reference) is relevant prior art. Applicants reserve the right to challenge the accuracy and pertinence of any cited reference.

What is claimed is:

1. An animal litter comprising:
    (a) a plurality of absorbent particles comprising
        (i) a non-swelling particle comprising a non-swelling clay particle or an agglomeration of non-swelling clay particles, and
        (ii) a clumping material comprising bentonite coated on the non-swelling particle; and
    (b) a plurality of one or more filler particles that are not associated with the absorbent particles, wherein the filler particles are one or more biological materials.

2. The litter of claim 1 wherein the filler particles have a property selected from the group consisting of controlling odor, absorbing moisture, releasing fragrance, controlling microorganisms, controlling dust, reducing density, reducing weight, and combinations thereof.

3. The litter of claim 1 wherein the filler particles further comprise one or more biodegradable polymers.

4. The litter of claim 3 wherein the biodegradable polymers are selected from the group consisting of a caprolactone, a hydroxyburic acid, a lactide, a glycolide, a polyanhydride, a polyester, chitosan, poly(vinylpyridine), and poly(vinylpyrrolidone).

5. The litter of claim 1 wherein the biological materials are selected from the group consisting of wood pellets, wood shavings, oat hulls, peanut hulls, corn products, alfalfa, dried citrus peel cellulose, byproducts of wheat, byproducts of barley, byproducts of soy, and paper.

6. The litter of claim 1 wherein the filler particles further comprise one or more zeolites.

7. The litter of claim 6 wherein the zeolites are selected from the group consisting of clinoptilolite, analcime, and zeolite A.

8. The litter of claim 1 wherein the filler particles further comprise charged polymers.

9. The litter of claim 8 wherein the charged polymers have a carboxylic acid functionality, a sulfonate functionality, an ammonium functionality, a phosphate functionality, or an ester functionality.

10. The litter of claim 1 wherein the filler particles are about 0.5 to about 40% by weight of the animal litter.

11. The litter of claim 1 wherein the filler particles have a size range of about 3 mesh to about 150 mesh.

12. The litter of claim 1 wherein the clumping material particles are about 20 to about 40% by weight of the absorbent particles.

13. The litter of claim 1 comprising two or more different types of filler particles.

14. The litter of claim 1 wherein the filler particles are contained in a carrier particle.

15. The litter of claim 1 wherein the filler particles are coated with bentonite.

16. The litter of claim 1 wherein the filler particles further comprise activated carbon.

17. The litter of claim 1 wherein the filler particles are coated with one or more starches, metal oxides, mineral powders, or combinations thereof.

18. The litter of claim 17 wherein the filler particles are coated with $TiO_2$ or $SiO_2$.

19. The litter of claim 17 wherein the filler particles are coated with talc.

20. An animal litter comprising:
   (a) a plurality of absorbent particles comprising:
      (i) a non-swelling clay particle or agglomerated clay particle with a size in the range of −10 to +50 mesh; and
      (ii) bentonite, with a particle size of about 100 mesh to about 300 mesh, coated on the non-swelling clay particle; and
   (b) a plurality of one or more filler particles that are not associated with the absorbent particles, the filler particles comprising one or more biological materials having a property selected from the group consisting of controlling odor, absorbing moisture, releasing fragrance, controlling microorganisms, controlling dust, reducing density, reducing weight, and combinations thereof.

\* \* \* \* \*